United States Patent
Stahel et al.

(10) Patent No.: US 7,936,257 B2
(45) Date of Patent: May 3, 2011

(54) EMERGENCY INTERVENTION SYSTEM AND APPROPRIATE METHOD FOR AUTOMATICALLY REDRESSING MALFUNCTIONS IN MEANS OF TRANSPORT

(75) Inventors: Michael Stahel, Raemismuhle-Zell (CH); Claudine Delavy, London (GB)

(73) Assignee: Swiss Reinsurance Company, Zürich (CH)

( * ) Notice: Subject to any disclaimer, the term of this patent is extended or adjusted under 35 U.S.C. 154(b) by 263 days.

(21) Appl. No.: 12/137,219

(22) Filed: Jun. 11, 2008

(65) Prior Publication Data

US 2009/0115588 A1    May 7, 2009

Related U.S. Application Data

(63) Continuation of application No. PCT/EP2007/005128, filed on Jun. 11, 2007.

(51) Int. Cl.
    *B60Q 1/00* (2006.01)
(52) U.S. Cl. .......................................... 340/438; 700/32
(58) Field of Classification Search .................. 340/438; 705/4, 8; 700/32, 49
    See application file for complete search history.

(56) References Cited

U.S. PATENT DOCUMENTS

| | | | |
|---|---|---|---|
| 2008/0164769 A1* | 7/2008 | Eck | 307/116 |
| 2009/0063236 A1* | 3/2009 | Pennay | 705/8 |
| 2009/0115588 A1* | 5/2009 | Stahel et al. | 340/438 |
| 2009/0171480 A1* | 7/2009 | Weber | 700/79 |
| 2009/0204235 A1* | 8/2009 | Dubinsky | 700/32 |
| 2009/0307012 A1* | 12/2009 | Delavy et al. | 705/4 |

* cited by examiner

*Primary Examiner* — John A Tweel, Jr.
(74) *Attorney, Agent, or Firm* — Oblon, Spivak, McClelland, Maier & Neustadt, L.L.P.

(57) ABSTRACT

The invention proposes an emergency intervention system and a method for automatically redressing malfunctions in means of transport (41). A sensor system (401) in an emergency intervention system (80) is used to detect occurring malfunctions and an activation apparatus (203) is used to generate dedicated activation signal data on the basis of a detected malfunction. The activation signal data are transmitted to an appropriate, automated intervention means (40) which is used to redress the malfunction. A switching module (104) in the emergency intervention system (80) enables the activation apparatus (203) if a cumulative stack memory level value for two stack memories (102/202) reaches a defined cumulative stack memory level value. The two stack memories (102/202) are preliminarily incremented on the basis of activation parameters transmitted by network units and are decremented in line with the dedicated activation signal data during the enabling. When a predefinable time window has elapsed, the emergency intervention system (80) is reset using a clearing module and the enabling is interrupted by means of the switching module (104).

29 Claims, 2 Drawing Sheets

EMERGENCY INTERVENTION SYSTEM AND APPROPRIATE METHOD FOR AUTOMATICALLY REDRESSING MALFUNCTIONS IN MEANS OF TRANSPORT

CROSS-REFERENCE TO RELATED APPLICATIONS

This application is a continuation of International Application No. PCT/EP2007/005128, filed on Jun. 11, 2007.

BACKGROUND OF THE INVENTION

The invention relates to an emergency intervention system and a method for automatically redressing malfunctions in means of transport. A sensor system in an emergency intervention system is used to detect occurring malfunctions and an activation apparatus is used to generate dedicated activation signal data on the basis of a detected malfunction. The activation signal data are transmitted to an appropriate, automated intervention means which is used to redress the malfunction.

PRIOR ART

For differentiated signal generation, human interaction was a necessary prerequisite for a long time in many areas of industry, engineering and science as soon as the complexity of the apparatuses involved, detected measurement parameters or controllable processes and interactions with the environment exceeded a certain level. Particularly in the case of control, inspection and monitoring of dynamic and/or nonlinear processes, automation eluded the prior art. Often, it was particularly the nonlinearity which deprived conventional apparatuses of the ground for automation. Many technical implementations of the widest variety of types of early warning apparatuses, image and/or pattern recognition apparatuses, particularly in the case of analogue measurement data or when the apparatus needs to be self-organizing, are in many cases still not achieved satisfactorily in the prior art today. Most natural processes take place at least to some extent in nonlinear fashion and tend to have an exponential behaviour outside a narrow linear equilibrium range. Efficient and reliably operating early warning signal generation and automated redressing of malfunctions can therefore be important to survival for many of these technical devices. These range from complex technical apparatuses such as aircraft, robots, assembly lines etc., each with many thousands of sensors and measurement signals, through to monitoring and control systems based on uncontrollable environmental influences, such as meteorological (storms, hurricanes, floods), geological (earthquakes) and economy-based (stock exchange) influences.

The underlying technical problems range from differentiated, automated detection of the measurement parameters, their specific selection and filtering and buffering of the data, realtime weighting, detection of correlations, analysis and triggering through to signal generation, selective activation or enabling of appropriate apparatuses and possible feedback of time-dependent, dynamic actions of the apparatuses. When a technical problem of this kind eludes the prior art, human interaction, particularly at the interfaces between two technical units, inevitably plays a key role. The nonlinear neural structure of the human brain was for a long time better suited to the likewise frequently nonlinear processes in problem recognition, monitoring, signal generation or technical tuning of the apparatuses than corresponding technical, automated apparatuses. Today, human interaction comes up against boundaries and problems in many areas, however, and the prior art would not have afforded any appropriate alternative. First, the quantity of measurement parameters recorded by sensors, image capture units or else of existing, historical data has increased to an unforeseeable degree in recent years. It is not comparable with the volume of data as was still available approximately 10 years ago. Frequently, this large quantity of measurement parameters no longer allows all-inclusive, reliable and/or reproducible monitoring by a human. Secondly, the reaction times which are required for the systems have become so short for many applications that human interaction on these systems is no longer sufficient merely as a result of the short reaction times and/or the quantity of recorded measurement parameters. In the case of systems with a realtime reaction time as a necessary prerequisite for optimum operation, such as control automation and robotics, what has been said becomes obvious. As a consequence of the operation, the signal generation should, if necessary, also allow dynamic and/or feedback-controlled adjustment of the system, of operation and/or of signal generation. In many technical application areas, this is no longer possible by means of human interaction. In the case of complex systems, human interaction also has the drawback that its susceptibility to error does not rise linearly on the basis of the complexity. The behaviour or operation of the system becomes unpredictable. Unexpected interruptions to operation or system crashes are the result. There are numerous recent examples of this, such as system-generated interruptions to operation in systems coupled to human interaction. By way of example, aircraft crashes which are unforeseeable despite all the emergency intervention apparatuses and systems (e.g. Swissair MD11 crash ahead of Halifax on Mar. 11, 1998 or the air disaster at Überlingen in July 2002), stock exchange crashes with a worldwide collapse of financial systems and financial institutes etc. etc.

The aforementioned drawbacks have created an increased need in industry for technization and automation by means of efficient signal-generation, alarm, monitoring and/or operational intervention systems or apparatuses which are able to effectively intercept such events or their effect without the need for any human interaction. The apparatuses should include the option of dynamic self-organization in the event of altered conditions or altered technical effects of systems. In this context, differentiated measurement parameter recording and signal generation with appropriate intervention apparatuses for redressing malfunction and for dynamic activation or for signal transmission should have as short a reaction time as possible or even a reaction time in realtime. It is clear to a person skilled in the art that pure software-based implementation (where at all possible) and/or increase in the available processor power (computing power) is not sufficient for the technical implementation of the automation in the case of most systems. Particularly in the case of the aforementioned complex system with a nonlinear process background and a large volume of generated measurement data with unknown dependences and correlations, the technization and automation elude mere software-based implementation on a computer. In this context, there are therefore very few cases in which the technical implementation is a commonplace matter for a person skilled in the art to find without any assistance. This is so even when the individual technical apparatus elements used should be known in the prior art. Specifically, this also relates to the mode of action of these apparatuses. Process cycles usually cannot be simulated or are difficult to simulate in interaction with complex systems, which means that the technical cooperation of the apparatus elements used, even though they may be known individually or commonplace, are not foreseeable and not commonplace for a person skilled in the art in terms of their action and interaction on the process cycles or the apparatuses which are being controlled. Stated conversely, since the action of an apparatus is not foreseeable, the technical implementation or combination of the apparatus elements, of the selection of the influencing parameters etc. in the case of such processes is usually not foreseeable and therefore not commonplace for a person skilled in the art.

Malfunctions and interruptions to operation in the case of sensitive, automated systems are meant to be prevented or at least detectable and redressable as quickly as possible by means of the present apparatus. Usually, it is a necessary condition for operation that such systems identify and preventively counteract the possibility of malfunctions occurring in good time as an early warning system. In this context, a feature of such intervention apparatuses may be not just the type of intervention means (e.g. catastrophe resources such as building and construction apparatuses, alarm apparatuses such as siren control apparatuses, malfunction means such as supply apparatuses or supply control apparatuses (water control equipment, fuel and lubricant control equipment, ducting systems with pump and sluice control apparatuses etc.)) but also the way in which the control parameters measured by the recording apparatuses and detection apparatuses are processed and technically implemented for controlling activation units for the intervention means or alarm means. It is precisely the technical implementation which results in barely negotiable technical problems in today's complex systems with equally complex dependences.

Another difficulty is that the available volume of data can come from a wide variety of heterogeneous, analogue or digital recording apparatuses and detection apparatuses, such as wind speed sensors, satellite pictures, water level sensors, water and wind temperature sensors etc. Similarly, technical problems can be found in that the operation of the cited signal generation apparatuses, alarm, control and/or operational intervention apparatuses usually interferes or correlates not only with/to nonlinear processes in the environment but also with/to dynamically altered processes from other automated or semi-automated processes in apparatuses. It is entirely possible for the interaction itself also to come from processes on the stock exchange, in the insurance industry or in indemnity-coverage and risk-control systems, for example, which are on the fringe of patenting, since they are usually counted as business methods. The differentiated signal-generation and control/monitoring apparatus itself is always technical and, on account of its interaction, in most cases not commonplace for a person skilled in the art, however, since the functioning of the possibly known, individual components of the apparatus does not allow him to infer the mode of action of the apparatus when interacting with the nonlinear processes, or allows him to infer it only with difficulty, or conversely allows him to infer the necessary interaction of the individual components for the apparatus from the processes ordinarily.

In the automotive industry, coupled or noncoupled malfunction apparatuses, intervention systems and appropriately integratable signal-generation or alarm apparatuses, as well as emergency-control or malfunction apparatuses, are known in different variations in the prior art. German patent specification DE 101 39 616 A1 shows an example of a malfunction apparatus which changes operation dynamically in the event of malfunctions. In addition, the installation of control apparatuses directly in the vehicle with transmission of measurement signals to a central control apparatus is also known, for example. By way of example, it is known practice for these control apparatuses to transmit location-dependent electrical signals to a central unit periodically or upon request for the purpose of automated alarm triggering. The international patent specification WO 2004/111962 A2/A3 discloses an alarm apparatus of this kind, where recording apparatuses are used to record measurement parameters and to transmit them to a central unit which, in the event of malfunctions, automatically generates an alarm signal and transmits it to the relevant operational intervention means. German patent specification DE 199 51 076 A1 shows a signal-generation and activation apparatus in which, in emergency situations, signals are transmitted to a central unit which generates appropriate control commands for activating communication and alarm apparatuses in the motor vehicle. The operation of vehicles, such as cars, lorries, boats, aircraft and the like, is subject to a multiplicity of possible malfunctions or other risk events. By way of example, different use or use at different locations in the case of vehicles often results in different types of malfunctions and/or probabilities of malfunctions. Examples of such malfunctions are accidents, wear and/or abrasion on account of poor road conditions, environmental influences (e.g. hail etc.) and/or danger to people and property on account of crimes such as car theft, car hijacking, vandalism and assault. More rarely than the already stated causes of malfunctions, the use of some vehicles may also entail risks to people and property on account of terrorist activities or fighting, e.g. in geographical regions with military or political conflicts. The owners and operators of vehicles influence a large portion of the risk of malfunctions which are connected to the use of their vehicles. An owner and operator can minimize the probability of malfunctions through careful operation and correct assessment, for example by avoiding driving through areas with unpredictable environmental influences or a high level of criminality at night in the interest of dependability or personal safety. In addition to the effects of the malfunctions for the owner and/or operator, the malfunction in the vehicle may, however, also affect third parties which have a technical or economic dependence on a vehicle or its operation. Often, such secondarily affected parties have little or no control over how an operator uses the vehicle, even though these parties may be greatly affected by the use of the vehicle. The dynamic signal generation in motor vehicles for monitoring and transmission to other units and adjustment of these units is shown by international patent specification WO 2007/133991 A2, for example. When trigger events occur, the detection apparatuses installed in the motor vehicle in dedicated fashion transmit signal data to an activation apparatus. These can also include partially automated or unautomated insurance systems, inter alia.

Something else which is known in the case of malfunctions is the interaction of dynamically controlled, user-specific signal-generation apparatuses with partially automated or unautomated switching or activation apparatuses, which comprise at least one monetary-based memory. Applicable examples from the prior art are the international patent specifications WO 97/27561 A2/A3 (cf. EP0877992) and WO 2007/128119 A1 or American patent specification US 2007/0225912 A1. A similar example of a dynamic signal-generation apparatus for interaction with partially automated operational-intervention or compensation apparatuses is also shown by Canadian patent specification CA 2235566 A1. Similarly, German patent specification DE 19901336 A1 shows the one automated, dynamic signal-generation apparatus. This document discloses charging and transmission of the relevant data for motor vehicles on the basis of time consumption. In this case too, the signal-generation apparatus forms the automated link between the motor vehicle and a partially automated or unautomated indemnity coverage system. A monetary-based buffer system with a dynamically triggered activation apparatus in this case becomes an automated or semi-automated switching system for other malfunction apparatuses. Patent specifications WO 2007/104982 A2/A3 or US 2007/0225912 A1 show another dynamic system for dynamic signal transmission and adaptation of the switching or insurance system.

In the prior art, the known alarm, control and malfunction intervention apparatuses are typically additionally distinguished according to technical applications by the type and volume of the available event data for malfunctions. In particular, a distinction is drawn between applications with a very small volume of available historical malfunction event data and areas with a high level of statistics relating to the malfunctions. This is also reflected in the technical applications in science, which differ between areas with a high level of statistics, such as chemistry with chemical reactions or particle physics with accelerators/reactors, detectors and control apparatuses, and areas with a low level of statistics, such as space research, missile technology or astronomy. Malfunctions in motor vehicles count among the applications with a high level of statistics. By way of example, not very many moon landings have yet been effected, which means that the technical opportunities for malfunctions in the landing rockets, for example, and the probabilities of occurrence for the respective malfunction can be estimated only with difficulty. By contrast, at any one time there are millions of motor vehicles in operation on this planet, which means that malfunction interventions can be estimated and planned for exactly. Whereas attempts are made to keep the laboratory conditions in the sciences always at the same technical level in order to allow repetition, however, this does not happen in the case of malfunctions in motor vehicles. By way of example, a user may live in a comparatively safe area but can quickly and unpredictably enter higher-risk areas for malfunctions. A user of a vehicle may drive into areas with a high proportion of accidents or with a high level of environmental risk more frequently than a comparable other user, for example, and may therefore have a higher probability of malfunction or accident. Despite all of these user-specific uncertainties, it can be stated that the data for malfunctions are known relatively precisely over many years. A high level of statistics regarding instances of intervention on the basis of malfunctions are available in many areas. This distinguishes the technical applications in the automotive industry fundamentally from other areas of the vehicle industry, such as the aircraft industry or space travel. Alternatively, unpredictable exceptions in the statistics may arise in the automotive industry, e.g. as a result of statistically rare environmental events such as malfunctions caused by catastrophic events such as earthquakes, hurricanes, floods etc.

TECHNICAL OBJECT

It is an object of this invention to propose an emergency apparatus and method for automatically redressing malfunctions in transport means which do not have the aforementioned drawbacks. In particular, it is meant to be possible to use a suitable sensor system in the emergency intervention system to automatically detect malfunctions which occur and to use an activation apparatus to automatically generate dedicated activation signal data on the basis of the detected malfunction and transmit them to specifically selected intervention means. These intervention means specifically selected by the emergency intervention system are intended to be able to be used to redress the malfunction efficiently and without any interaction by the user.

The present invention achieves this aim particularly by means of the elements of the independent claims. Further advantageous embodiments can also be found in the dependent claims and the description.

In particular, these aims are achieved by the invention in that automatically redressing malfunctions in transport means using a sensor system in an emergency intervention system involves occurring malfunctions being detected, where an activation apparatus generates dedicated activation signal data on the basis of a detected malfunction and transmits them to an appropriate, automated intervention means, and where the intervention means is used to redress the malfunction, in that a first incrementable stack memory in a protected memory module is assigned to one or more means of transport, where an interface module in the emergency intervention system is used to transmit predetermined activation parameters from a first network unit periodically via a network to the emergency intervention system and the stack memory is incremented in steps on the basis of the transmitted activation parameter, in that the interface module is used to transmit complementation parameters from a multiplicity of second network units via the network to the intervention system, the complementation parameters comprising at least identification data from the respective second network unit and a user-specific complementation factor, in that the intervention apparatus comprises a protected complementation memory module having a second incrementable stack memory and a lookup table, where the second stack memory is incremented on the basis of the complementation factor and where the complementation factor and the identification data are stored in association with one another as a pair of values using the lookup table, in that a switching module in the emergency intervention system cumulatively detects a stack memory level value for the two stack memories and, if a defined cumulative stack memory level value is reached, enables the activation apparatus, in that a correlation module to the activation apparatus generates appropriate malfunction parameters on the basis of the activation of the intervention means and/or on the basis of the dedicated activation signal data and quantitatively weights them using the complementation factors from the lookup table, the malfunction parameters being used to decrement the stack memory level value of at least one of the two stack memories, in that a clearing module in the emergency intervention system is used to reset a cumulative stack memory level value for the two stack memories after a predefinable time window has elapsed and to generate clearing parameters on the basis of the pairs of values in the lookup table and transmit them via the interface module to the second network units if the cumulative stack memory level value reaches a predetermined threshold value, the switching module interrupting the enabling of the activation apparatus. In other words, when a predefinable time window has elapsed, the emergency intervention system is reset by means of a clearing module and the enabling is interrupted by means of the switching module. By way of example, the counter module may comprise an integrated oscillator, which oscillator can be used to produce an electrical clock signal at a reference frequency, the counter being able to be incremented periodically on the basis of the clock signal. The activation apparatus may comprise a switching module for activating the intervention means, for example, said switching module being able to be used to enable the activation apparatus only if the recording of the activation parameters is detected periodically. By way of example, the intervention means may comprise automated emergency apparatuses and/or alarm and control modules (e.g. for automated closing or extinguishing apparatuses) and/or cash-value-based transmission modules. The invention has the advantage, inter alia, that the automated emergency intervention system allows uncorrelated operational backup even for systems with relatively small malfunction fluctuations, such as in the car industry. In particular, fully automated emergency intervention apparatuses also become possible, e.g. based on quote sharing. This has not been possible with any prior art system to date. The system can also be used to enable otherwise engaged means (particularly also cash-based means, such as financial means), inter alia, for backup of the operating function for other purposes without impairing the dependability of the automated emergency intervention system. Another advantage is that the emergency intervention system can be used with additional coverage to achieve a freely-definable safety threshold value or rating or to increase a rating without this necessitating the integration of additional means into the system or necessitating the engagement of other means from the operator. Since the probability of malfunctions is recorded with a relatively high level of accuracy in the automotive industry, the emergency intervention system based on the invention can also be used to additionally optimize marginal parameters, such as cash-value-based operational backup parameters or collateralization level parameters, by virtue of not only the probability of operational intervention being safeguarded in uncorrelated fashion by means of the automated emergency intervention system but also other uses, particularly capital gains, being possible using, if necessary, liberated means. This is not possible in this way with any system from the prior art. In addition, this has the advantage, inter alia, that it is also possible for automated multistage emergency intervention systems to be covered using the inventive system and for their dependenability to be increased. If the system is linked to a quote-sharing method, however, parallel stages are involved, in contrast to multistage systems, e.g. in the case of emergency intervention systems for malfunctions caused by catastrophes, such as floods, hurricanes, earthquakes and/or terrorist attacks. The aforementioned increase in the dependability of such systems with the likewise aforementioned advantages for the user has to date not been possible in this way in the prior art.

In one variant embodiment, the automated emergency intervention system has been connected unidirectionally or bidirectionally to the one or more means of transport by means of a control and/or alarm apparatus for the purpose of automated emergency intervention in the event of malfunctions in the one or more means of transport. By way of example, the recording apparatus may comprise a position-finding module, for example, which is used to generate location coordinate parameters for the current location of the transport means and to transmit them to the emergency intervention system using the control and/or alarm apparatus in one or more transport means. This variant embodiment has, inter alia, firstly the advantage that the activation parameters can be adapted in realtime and/or periodically using the emergency intervention system, for example. Secondly, this variant embodiment also has the advantage that operational interventions and/or alarm signals and/or control/monitoring signals can be matched to the appropriate intervention event or transport means in targeted and likewise optimized fashion and/or initiated by the automated emergency intervention system.

In one variant embodiment, the emergency intervention system comprises a first reading module for generating a first stack memory level value in line with the current stack memory level of the first incremented stack memory, the first incrementable stack memory being able to be additionally incremented by means of a first adder module on the basis of the first stack memory level value. Similarly, the intervention apparatus may comprise a second reading module, for example, for generating a second stack memory level value in line with the current stack memory level of the second incrementable stack memory, the second incrementable stack memory being able to be additionally incremented by means of a second adder module on the basis of the second stack memory level value. This variant embodiment has, inter alia, the advantage that the periodically recorded activation parameters can be optimized without having any influence on the dependability of the inventive apparatus.

In another variant embodiment, the first reading module comprises means for generating the first stack memory level value in realtime. The emergency intervention system may also comprise a timer unit, for example, the first stack memory level value being able to be produced periodically within a definable time window. Like the first, the second reading module may also comprise means for generating the second stack memory level value in realtime. The emergency intervention apparatus may also comprise a timer unit, for example, the second stack memory level value being able to be produced periodically within a definable time window. This variant embodiment has, inter alia, the advantage that the activation parameters can be adapted dynamically in realtime without having any influence on the dependability of the inventive apparatus and system.

In another variant embodiment, the emergency intervention system may comprise a network interface, the network interface being used to access at least one decentralized database with associated stock-exchange and/or financial-institute parameters. This variant embodiment has, inter alia, the advantage that in the case of a technical implementation of the emergency intervention apparatus in conjunction with cash-value-based systems it is possible to provide fully automated operational backup for the means of transport. Equally, the emergency intervention system may in this case be used to intercept fluctuations in stock-exchange tracks or corresponding financial parameters fully automatically without impairing the dependability of the inventive system.

In yet another variant embodiment, the complementation memory module comprises a memory area which is separate from the incrementable stack memory, the lookup table being used to assign protected portions of the stack memory to the separate stack memory. This variant embodiment has the advantage, inter alia, that the clearing parameters are assigned to the respective identification data by means of the lookup table not exclusively on the basis of the first and/or second stack memory, but rather a minimal association is guaranteed to the user by the emergency intervention system.

In another variant embodiment, the emergency intervention system comprises, in addition to the complementation memory module, at least one submodule which comprises different intervention classes and/or probability groups, and when definable threshold values are reached by counters the lookup table is used to assign clearing parameters to the respective identification data on the basis of the first and second stack memories and the intervention apparatus is used to transmit them to at least one network unit via an interface module. By way of example, the submodules may be associated such that they can be altered by the complementation memory module, particularly in the form of one embodiment such that they can be altered dynamically on the basis of a user profile. This variant embodiment has, inter alia, the advantage that graduated transmission of the clearing parameters, for example for the purpose of crediting cash-sum values, can be assigned on the basis of the second memory unit and can be transmitted to a clearing module, for example, if the second memory unit comprises clearing parameters after the time interval has elapsed.

At this juncture, it should be stated that the present invention relates not only to the inventive method but also to a system for carrying out this method and to a corresponding computer program product.

Variant embodiments of the present invention are described below with reference to examples. The examples of the embodiments are illustrated by the following appended figures.

Figure 1:
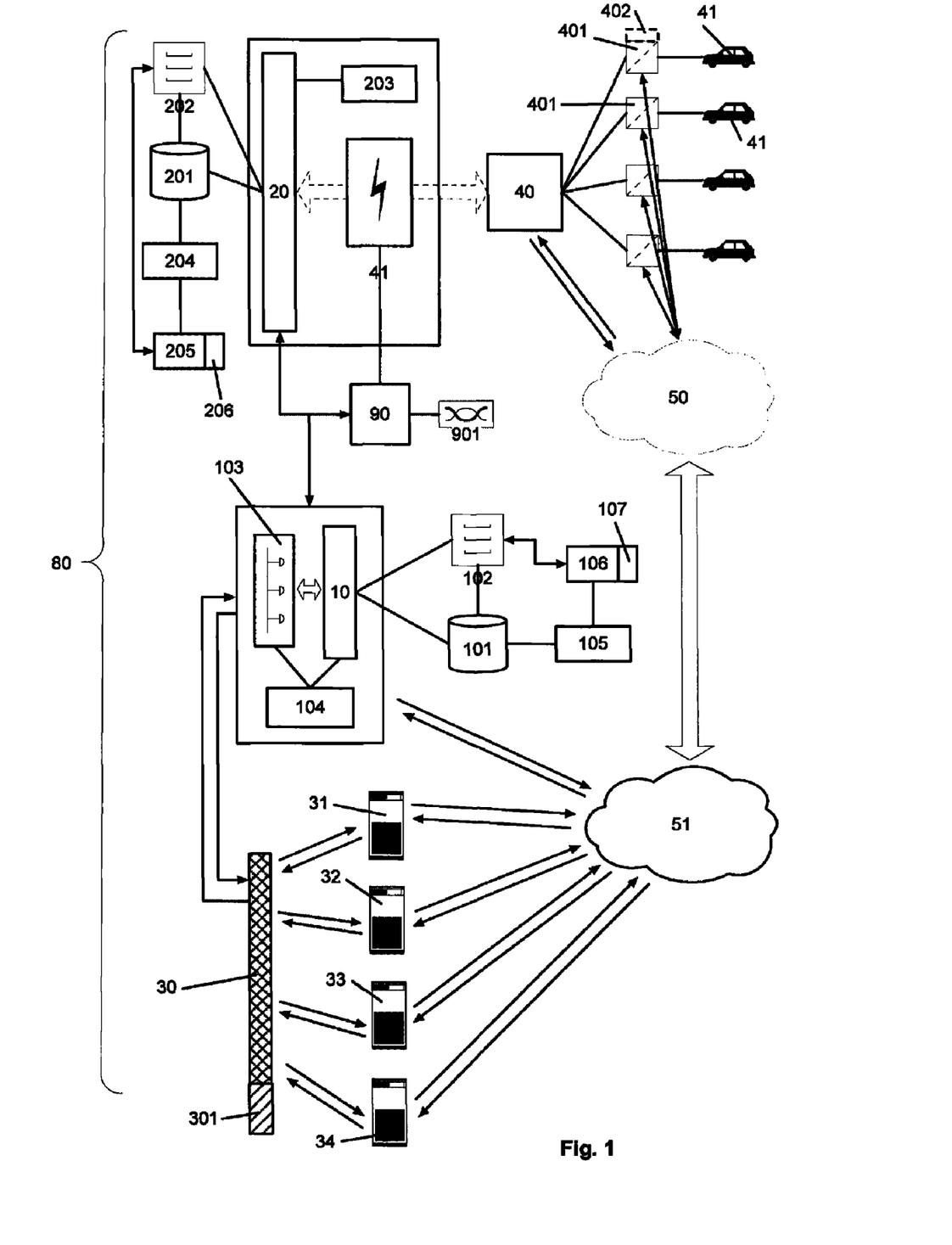
FIG. 1 shows a block diagram which schematically shows an exemplary embodiment of an inventive emergency intervention system 80 for automatically redressing malfunctions in means of transport 41. A sensor system 401 in the emergency intervention system 80 is used to detect an occurring malfunction and an activation apparatus 203 is used to generate dedicated activation signal data for the detected malfunction and transmit them to an appropriate, automated intervention means 40. The intervention means 40 is used to address the malfunction without the need for interaction by the user.
Figure 2:
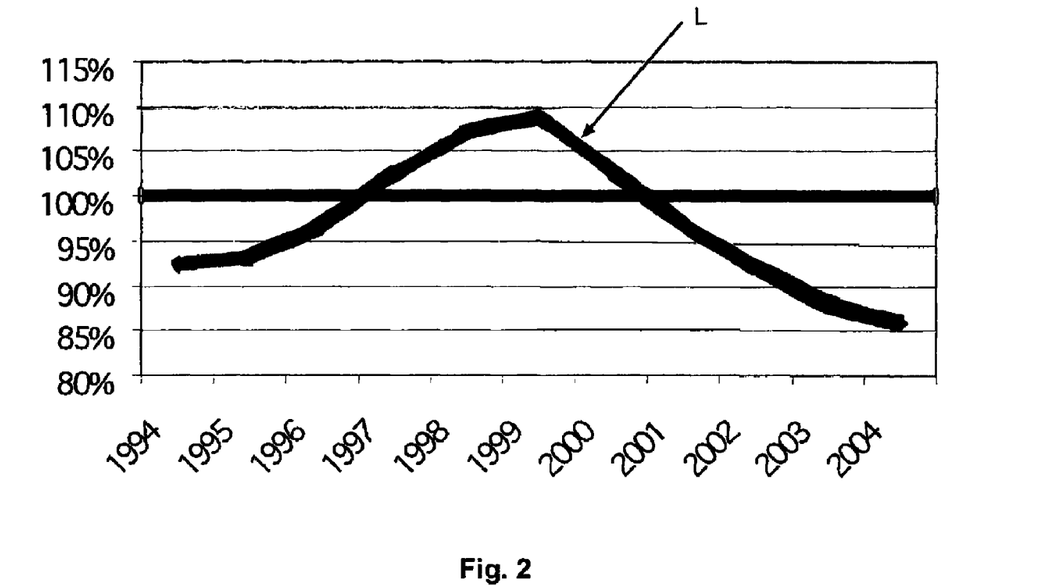
FIG. 2 relates to the TPL in the technical implementation of a cash-value-based exemplary embodiment of the invention apparatus 80. The figure shows the intervention ratio for stack memory level detection in the case of intervention events for third parties (Third Party Liabilities: TPL). In 2004, one possible embodiment of the invention had them at 86%, for example.
Figure 3:
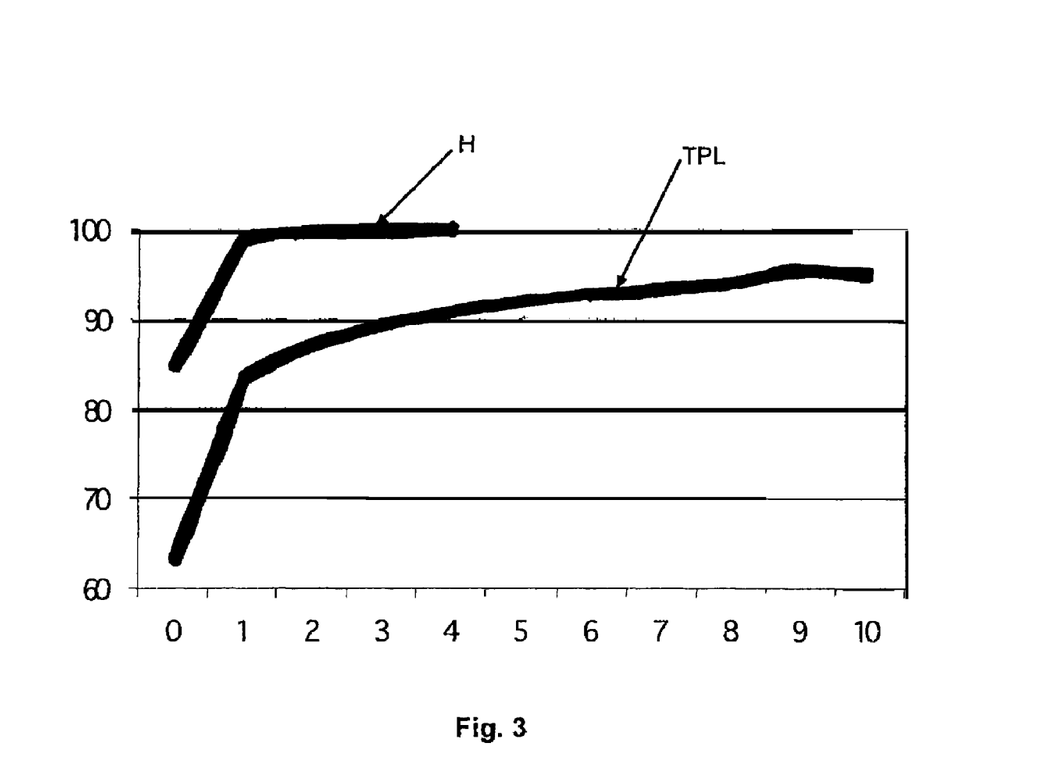
FIG. 3 likewise shows the TPL for the technical implementation of a cash-value-based exemplary embodiment of the intervention apparatus 80, shows the level of intervention in the case of malfunctions in the vehicle by means of the line H and shows the intervention for third parties by means of the line TPL on the basis of the years for an exemplary embodiment 80 for means of transport apparatuses 41.

FIG. 1 illustrates an architecture which can be used to implement the invention. In this exemplary embodiment, occurring malfunctions are detected using an appropriately selected or adapted sensor system 401 in an emergency intervention system 80 or a malfunction redressing apparatus 80 for the purpose of automatically redressing the malfunctions in means of transport 41. Means of transport 41 are to be understood to mean any type of motor vehicles, such as cars, lorries, rail means of transport and trains, two-wheeled and three-wheeled vehicles such as motorcycles, bicycles, aircraft or other means of transport for people or goods. The automated emergency intervention system 80 can comprise automatically triggered extinguishing systems, power-breaker or emergency-generator systems, operational monitoring systems with automated control and/or alarm apparatuses, signal-conversion or relay systems for automatic alarm or monitoring-control triggering etc. For the purpose of automated emergency intervention in the event of malfunctions, the emergency intervention system 80 may have a unidirectional or bidirectional connection to the means of transport 41 by means of a monitoring and/or alarm apparatus 402. The connection can be made by means of an air-based and/or land-based connection, particularly in hardwired and/or wireless form. By way of example, the sensor system may comprise sensors for measuring speed, engine heat and/or fuel or may comprise other operational parameters for the means of transport 41. The sensor system 401 may also comprise a position-finding module, for example, which position-finding module is used to generate location-coordinate parameters for the current location of the means of transport 41 and to transmit them to the emergency intervention system 80 using the monitoring and/or alarm apparatus 402 of the one or more means of transport 41. In particular, the sensor system 401 may also comprise means for recording user-specific measurement parameters for the vehicle user (e.g. blood pressure, alcohol, eye tracking, skin surface tension, blood sugar, heart beat etc.). An activation apparatus 203 is used to generate dedicated activation signal data on the basis of the detected malfunction and to transmit them to an appropriate, automated intervention means 40. The activation apparatus 203 may have a unidirectional or bidirectional connection to the automated intervention means 40. This allows fully automated monitoring, control and intervention. The intervention means 40 is used to redress the malfunction, so that the means of transport 41 can resume full operation for the user. The automated intervention means 40 may comprise, by way of example, automatically triggered extinguishing systems, power-breaker or emergency-generator systems, operational monitoring systems with automated control and/or alarm apparatuses (particularly for alarm triggering for police, military, catastrophe or invalid-rescue assignments), signal-conversion or relay systems for automated alarm or monitoring-control triggering, control and regulation systems for ducting or other pipe systems etc. A first incrementable stack memory 202 in a protected memory module 201 in the malfunction redressing apparatus 80 is assigned to one or more means of transport 41. An interface module in the malfunction redressing apparatus 80 or the emergency intervention system 80 is used to transmit predetermined activation parameters from a first network unit via a network 50 to the emergency intervention system 80 periodically and/or upon request. By way of example, the communication network 50 comprises a GSM or UMTS network, or a satellite-based mobile radio network and/or one or more landline networks, for example the public switched telephone network, the worldwide Internet or a suitable LAN (Local Area Network) or WAN (Wide Area Network). In particular, it also comprises ISDN and XDSL connections. The first stack memory 202 is incremented in steps on the basis of the transmitted activation parameter. A network interface 301 can be used by the emergency intervention system 80 to access at least one decentralized database containing associated stock-exchange or financial-institute parameters, for example. Hence, activation parameters can be based particularly on the transmitted stock-exchange or financial-institute parameters, for example. A first reading module 205 can be used to generate a first stack memory level value for the first stack memory 202 in real-time, for example. The emergency intervention system 80 can also use a timer unit 206, for example, to produce the first stack memory level value periodically within a definable time window. An integrated oscillator in the switching module 104 can be used to produce an electrical clock signal at a reference frequency, for example, with the counter being incremented periodically on the basis of the clock signal.

The interface module is used to transmit complementation parameters from a multiplicity of second network units 31, . . . , 34 to the intervention system 80 via the network 50. The complementation parameters comprise at least identification data for the respective second network unit 31, . . . , 34 and a user-specific complementation factor. The intervention apparatus 80 comprises a complementation module 10 including a protected complementation memory module 101 with a second incrementable stack memory 102 and an intervention module 20 including a memory module 201 with a first incrementable stack memory 202. The intervention apparatus 80 also comprises a lookup table 103. The second stack memory 102 is incremented on the basis of the complementation factor, the complementation factor and identification data being stored in association with one another as a pair of values using the lookup table 103. A switching module 104 in the emergency intervention system 80 cumulatively records a stack memory level value for the two stack memories 102/202. If a predefined cumulative memory threshold value is reached, the activation apparatus 203 is enabled. A control module can be used to enable the activation apparatus 203 to activate the intervention means 40 only if the recording of the activation parameters is detected periodically and/or in agreement with definable control parameters, for example. The intervention means 40 can be used to activate automated emergency apparatuses and/or cash-value-based transmission modules on the basis of the detected intervention events, for example. In one variant embodiment, the emergency intervention system 80 can use a second reading module 105 to generate a second stack memory level value in line with the current stack memory level of the second incrementable stack memory 102, for example, the second incrementable stack memory 102 being additionally incremented on the basis of the second stack memory level value using a second adder module 106. By way of example, the second reading module 105 can also be used to generate the second stack memory level value in realtime. Equally, the emergency intervention system 80 can use a timer unit 107 to produce the second stack memory level value periodically within a definable time window. A memory area which is separate from the incrementable stack memory 102 of the complementation memory module 101 can be used to assign protected portions of the stack memory 102 to the separate memory area on the basis of the lookup table 103, for example.

A correlation module 90 in the activation apparatus 203 takes the activation of the intervention means 40 and/or the dedicated activation signal data as a basis for generating appropriate malfunction parameters which are quantitatively weighted 901 using the complementation factors in the lookup table. On the basis of the malfunction parameters, the stack memory level value of at least one of the two stack memories 102/202 is decremented. A clearing module in the emergency intervention system 80 is used to read a cumulative stack memory level value for the two stack memories 102/202 after a predefinable time window has elapsed, and clearing parameters are generated on the basis of the pairs of values in the lookup table 103 and are transmitted to the second network units 31, . . . , 34 via the interface module 30 if the cumulative stack memory level value reaches a predetermined threshold value. In this case, the switching module 104 interrupts the enabling of the activation apparatus. By way of example, the interface module 30 can be used to transmit the activation parameters in protected form bidirectionally or unidirectionally, the clearing parameters being associated with specific identification data by means of the lookup table 103. In one variant embodiment, the emergency intervention system 80 can use a network interface 301 to access at least one decentralized database containing associated stock-exchange parameters, for example.

As already mentioned, the automated emergency intervention systems 80 or malfunction redressing apparatuses include, by way of example, automatically triggered extinguishing systems, power-breaker or emergency-generator systems, operational monitoring systems with automated control and/or alarm apparatuses, signal-conversion or relay systems for automated alarm or monitoring-control triggering etc. The malfunction redressing apparatus 80 may be connected to one or more further malfunction redressing apparatuses 80 in synchronized fashion on the basis of a quote sharing parameter for the malfunction probability and intervention risks or operational interruption risks. Since relatively small fluctuations in the operational interruptions and/or malfunctions detected in fixed time intervals are normal, it is possible for second stages of the malfunction redressing apparatus 80 (particularly in connection with automated reinsurance systems, for example) to implement the number of fault redressing operations in line with a fixed proportion parameter synchronized between the systems beforehand. The malfunction redressing apparatus 80 may also comprise a prediction module or extrapolation module. The extrapolation module can be used, by way of example, to generate the operational interruption probabilities for future time intervals. The extrapolation module may additionally also cover the generation and transmission of collateralization level parameters and/or fee parameters for cumulable malfunction parameters. Like the other units based on the invention, the extrapolation module may be implemented in hardware and/or software. In the case of the technical implementation of the extrapolation module, the intervention probabilities or such collateralization level parameters with cash-sum values for cumulable malfunction risks can be divided by means of a determinable user factor. These intervention probabilities or collateralization level parameters are stored in association with the cumulable malfunction risks in line with the determinable central unit factor. The malfunction redressing apparatus 80 can transfer the activation parameters for the cumulative operational interventions or the relevant stack memory level value to the memory module 201. In this variant embodiment, the network units 31 to 34 can transfer cash-sum values, for example, on the basis of the determinable user factor to the complementation memory module 101 and can store them in association with the cumulable malfunction probabilities and/or stack memory level values. The network units 31 to 34 can comprise technically individualizable user modules of quite general type, for example. To implement the first and/or second adder module 106/205, it is possible, as an additional variant embodiment, for the stack memory levels to be transferred to a financial institute, for example, by means of the reading modules 105/204 (the stack memory level values being assigned to a cash-sum value) in the memory module 201 and/or in the complementation memory module 101 during the available time. The monitoring and/or control may be effected in automated fashion, for example, by means of the timer units 107/206. As one exemplary embodiment, the financial institute may cover the interaction with a bank and/or stock-market centre and/or an investor, for example. After the determinable time interval, fee parameters, such as interest and/or other returns from the transferred cash-sum values, are transferred, in line with the transmitted cash-sum values, as complementary activation parameters from the financial institute to the memory modules 101/201 and are automatically added to the already stored parameters and stored by the malfunction redressing apparatus 80, i.e. the first and/or second stack memory 102/202 is incremented accordingly. The malfunction redressing apparatus 80 can for example when intervention events have arisen in the time interval, transmit first charging data with charging parameters for crediting cash-sum values to a clearing module in association with a means of transport 41. The transmitted activation parameters or cash-sum values are decremented from the memory module 201 or the stored incrementation parameters in the memory module 201 and, if the memory module 201 does not comprise an appropriate stack memory level value for the first incrementable stack memory 202, from the complementation memory module 101. Second charging data with charging parameters for crediting cash-sum values can be transmitted to a clearing module in association with a network unit 31 to 34 on the basis of a determinable risk fee factor, for example. If the complementation memory module 102 comprises a positive stack memory level signal by means of the reading module 204 (in this case positive cash-sum values, for example) when the time interval has elapsed, for example on the basis of the timer unit 206, then third activation parameters with charging parameters for crediting cash-sum values are transmitted to a clearing module in association with the network unit 31 to 34 on the basis of the cash-sum values in the complementation memory module 101 and on the basis of the risk fee factor. Fee parameters and/or collateralization levels and/or malfunction events can be generated as appropriate charging data and/or parameters, for example, either by the emergency intervention system 80 or individual apparatus components or else by a signal apparatus in the financial institute or even by means belonging to a user, for example. The charging data and/or fee parameters may comprise charging records (e.g. electronically signed), for example, similar to CDRs (Call Data Records) in a case of what are known as DURs (DAB/DVB Usage Records). By way of example, the charging records are transmitted to a clearing module. The clearing module may also be associated locally with third parties such as a credit card company. The charging data are processed further by means of the clearing module, or said systems (emergency intervention apparatus 80, user means etc.) perform the charging independently. A repackaging module can be used to provide performance-oriented and/or clearing-module-specific activation parameters or charging data, for example, with an electronic stamp, an electronic signature or an electronic watermark in optimized fashion too. The electronic signature allows the charging data to be attributed to the relevant system and/or apparatus at an arbitrary later time. In one specific variant embodiment, it may make sense for the network units 31 to 34 to be attributed submodules with different probability classes and/or risk classes for malfunction events in the means of transport 41, e.g. including with different risk fee factors and/or e.g. different transmission condition parameters for transmitting cash-sum values from the memory module 201.

To achieve additional automation for the technical implementation, which, in particular, also makes dynamic adaptation of the inventive emergency intervention system 80 possible, the memory module 201 and/or the complementation memory module 101 may comprise a monitoring module, for example. The monitoring module acts as a trigger apparatus and may be implemented in hardware and/or software. The monitoring module can additionally be used, by way of example, to compare a risk fee factor with fee parameters on the basis of the cumulative implementation parameters or activation parameters of the memory module 101 and, if the risk fee factor is detected at a definable threshold value below the fee parameters, to activate intervention means in a second stage. To provide a feedback and/or monitoring option for a user, the weighting module 901 can be used, for example, to determine at least one variable weighting parameter on the basis of the detected first and/or second stack memory level signals and the maximum possible intervention disturbances. The weighting parameter can be adapted for one of the rating methods known generally in the prior art for rating people, articles or companies and/or can be normalized to such a method. For a user, it may be important to use a known rating method for the normalization, for example. To rate a debtor's ability to pay, rating codes are used in this case. The classification can be determined using dedicated criteria from the bank, or from internationally operating rating agencies, such as Moody's, Standard & Poor's or Fitch. By way of example, the known AAA may represent a high credit rating, and C or even D may represent a very poor one. The individual category names may differ from agency to agency. Thus, by way of example, Moody's uses numbers as a supplement, e.g. A1, A2, A3; while Standard & Poor's add the "+" and "−" symbols, e.g. B+, B, B−. The intervention apparatus can perform user-specific normalization dynamically on the basis of a user profile for a user, for example. Ratings can exist both for companies and for countries. Thus, by way of example, Austria has an AAA rating. In addition, a company can normally never achieve a better rating than the country in which it is domiciled. In the prior art, it is usually the case that a debtor with a better rating can obtain capital under better conditions. On the other hand, it is possible to achieve a higher return from debtors with poor rating, but the likelihood of payment default (credit rating risk) is much higher. It is therefore important to mention that downgrading the rating frequently has a catastrophic effect on companies and countries which suddenly have to provide more return for their capital requirements. In addition, there were therefore also frequently major disputes between the rating agency and the assessed systems and/or companies regarding the rating. For a good rating by the user, the stack memory level values of the protected memory module 201 and of the complementation memory module 101 and also the incrementation parameters and/or activation parameters for the first incrementable stack memory 202 may be relevant, for example. To be as attractive as possible to any users of the network units 31 to 34, it is possible to adapt the stack memory level or the activation parameter of the memory module 101, for example. This can also be done dynamically. At the same time, it is therefore additionally also possible, by way of example, to reduce the inherent transferred activation parameters (e.g. means engaged as collateralization level) using the emergency intervention system 80, or by adapting the stack memory level or the activation parameters of the memory module 101 and to enable them for other functions. This has also not been possible in this manner in the prior art to date. Part of this is the fact that intervention means 40 which are newly available to the emergency intervention system 80 are automatically compared, as mentioned, with fee parameters, e.g. by capital markets, and can be adapted as appropriate.

An interface on the weighting module can be used by the user to transmit the at least one variable weighting parameter, for example, to mobile and/or fixed network units or nodes 31 to 34 via a network 50/51. The user therefore has dynamic control over his associated network units 31 to 34. It is even conceivable for him to be able to adapt his association with one or more submodules 31/32/33/34 dynamically on the basis of the weighting parameters. By way of example, the communication networks 50/51 comprise a GSM or a UMTS network, or a satellite-based mobile radio network and/or one or more landline networks, for example the public switched telephone network, the worldwide Internet or a suitable LAN (Local Area Network) or WAN (Wide Area Network). In particular, it also comprises ISDN and XDSL connections.

The invention claimed is:

1. A method for automatically redressing malfunctions in means of transport by an automated emergency intervention system including a sensor system to detect occurring malfunctions and an activation apparatus to generate dedicated activation signal data based on a detected malfunction and transmit the dedicated activation signal data to an automated intervention means, the automated intervention means to redress the malfunction, comprising:

incrementing a first stack memory of a protected memory module assigned to one or more means of transport based on activation parameters transmitted periodically from a first network unit to the automated emergency intervention system via a network;

incrementing a second stack memory based on user-specific complementation factors transmitted from at least one of a plurality of second network units to the automated emergency intervention system, the at least one of the plurality of second network units transmitting complementation parameters to the automated emergency intervention system, the complementation parameters including at least identification data from a respective one of the plurality of second network units and the user-specific complementation factor;

storing the user-specific complementation factors and the identification data in association with one another as pairs of values in a lookup table;

detecting stack memory level values of the first and second stack memories and, when a cumulative memory threshold value is reached, enabling an activation apparatus;

generating malfunction parameters, when the activation apparatus is enabled and/or based on the dedicated activation signal data;

weighting the malfunction parameters using the user-specific complementation factors stored in the lookup table, the malfunction parameters being used to decrement the stack memory level value of at least one of the first and second stack memories; and reading a cumulative stack memory level value of the first and second stack memories after an elapsed time, generating clearing parameters based on the pairs of values in the lookup table, and, when the cumulative stack memory level value reaches a predetermined threshold value, transmitting, by a transmitter, the clearing parameters to the plurality of second network units and interrupting the enabling of the activation apparatus.

2. The method according to claim 1, further comprising:
communicating unidirectionally or bidirectionally to the one or more means of transport by a control and/or alarm apparatus for the purpose of automated emergency intervention in the event of malfunctions in the one or more means of transport.

3. The method according to claim 2, further comprising:
generating location coordinate parameters for a current location of the one or more means of transport; and
transmitting the generated location coordinate parameters by the control and/or alarm apparatus.

4. The method according to one of claims 1 to 3, wherein
the stack memory level value of the first stack memory is generated in real time by a first reading module.

5. The method according to one of claims 1 to 3, wherein
the stack memory level value of the first stack memory is generated periodically within a definable time window using a timer unit.

6. The method according to one of claims 1 to 3, wherein
the activation parameters are transmitted in protected form bidirectionally or unidirectionally by an interface module, and
the clearing parameters are associated with specific identification data stored in the lookup table.

7. The method according to one of claims 1 to 3, further comprising:
additionally incrementing the second stack memory by a second adder module based on the stack memory level value of the second stack memory, wherein
the stack memory level value of the second stack memory is generated by a second reading module.

8. The method according to claim 7, wherein
the stack memory level value of the second stack memory is generated in real time by a second reading module.

9. The method according to one of claims 1 to 3, wherein
the stack memory level value of the second stack memory is generated periodically within a definable time window using a timer unit.

10. The method according to one of claims 1 to 3, further comprising:
accessing at least one decentralized database with associated stock-exchange parameters.

11. The method according to one of claims 1 to 3, further comprising:
assigning protected portions of the second stack memory on the basis of the lookup table using a memory area separate from the second stack memory.

12. The method according claim 9, wherein
the timer unit produces an electrical clock signal at a reference frequency and periodically increases a counter based on the electric clock signal.

13. The method according to one of claims 1 to 3, wherein
the enabling the activation apparatus further comprises enabling the activation apparatus only when recording of the activation parameters is detected periodically and/or in agreement with definable control parameters.

14. The method according to one of claims 1 to 3, wherein
the intervention means comprises automated emergency apparatuses and/or cash-value-based transmission modules.

15. Automated emergency intervention system for redressing malfunctions in means of transport including a sensor system to detect occurring malfunctions and an activation apparatus to generate dedicated activation signal data based on a detected malfunction and transmit the dedicated activation signal data to an automated intervention means, the automated intervention means is used to redress the malfunction, comprising:

a first stack memory of a protected memory module assigned to one or more means of transport that increments based on activation parameters transmitted periodically from a first network unit to the automated emergency intervention system via a network;

a second stack memory that increments based on user-specific complementation factors transmitted from at least one of a plurality of second network units to the automated emergency intervention system, the at least one of the plurality of second network units transmitting complementation parameters to the automated emergency intervention system, the complementation parameters including at least identification data from a respective one of the plurality of second network units and the user-specific complementation factor;

a memory that stores the user-specific complementation factors and the identification data in association with one another as pairs of values in a lookup table;

a switching module that detects stack memory level values of the first and second stack memories and, when a cumulative memory threshold value is reached, enables an activation apparatus;

a clearing module that generates malfunction parameters when the activation apparatus is enabled and/or based on the dedicated activation signal data;

a weighting module that weights the malfunction parameters using the user-specific complementation factors stored in the lookup table, the malfunction parameters being used to decrement the stack memory level value of at least one of the first and second stack memories; and a clearing module that reads a cumulative stack memory level value of the first and second stack memories after an elapsed time, generates clearing parameters based on the pairs of values in the lookup table, and, when the cumulative stack memory level value reaches a predetermined threshold value, transmits the clearing parameters to the plurality of second network units and interrupts enabling of the activation apparatus by the switching module.

16. The automated emergency intervention system according to claim 15, further comprising:
a control and/or alarm apparatus that communicates unidirectionally or bidirectionally to the one or more means of transport for the purpose of automatic emergency intervention in the event of malfunctions in the one or more means of transport.

17. The automated emergency intervention system according to claim 16, further comprising:
a position-finding module that generates location coordinate parameters for a current location of one or more means of transport, wherein
the control and/or alarm apparatus transmits the generated location coordinate parameters.

18. The automated emergency intervention system according to claims 15 to 17, further comprising:
a first reading module that generates the stack memory level value of the first stack memory; and
a first adder module that additionally increments the first stack memory based on the stack memory level value of the first stack memory.

19. The automated emergency intervention system according to claim 18, wherein
the first reading module generates the stack memory level value of the first stack memory in real time.

20. The automated emergency intervention system according to one of claims 15 to 17, wherein
the stack memory level value of the first stack memory is periodically generated within a definable time window using a timer unit.

21. The automated emergency intervention system according to one of claims 15 to 17, further comprising:
a bidirectional or unidirectional interface module that transmits incrementation parameters, wherein
the activation parameters are assigned to specific identification data stored in the lookup table.

22. The automated emergency intervention system according to one of claims 15 to 17, further comprising:
a second reading module that generates the stack memory level value of the second stack memory; and
a second adder module that additionally increments the second stack memory based on the stack memory level value of the second stack memory.

23. The automated emergency intervention system according to claim 22, wherein
the second reading module generates the stack memory level value of the second stack memory in real time.

24. The automated emergency intervention system according to one of claims 15 to 17, wherein
the stack memory level value of the second stack memory is periodically generated within a definable time window using a timer unit.

25. The automated emergency intervention system according to one of claims 15 to 17, further comprising:
a network interface that accesses at least one decentralized database with associated stock-exchange parameters.

26. The automated emergency intervention system according to one of claims 15 to 17, further comprising:
a memory area separate from the second stack memory, wherein
protected portions of the second stack memory are assigned on the basis of the lookup table using the memory area separate from the second stack memory.

27. The automated emergency intervention system according to claim 24, wherein
the timer unit includes an integrated oscillator that produces an electrical clock signal at a reference frequency and a counter that periodically increases based on the clock signal.

28. The automated emergency intervention system according to one of claims 15 to 17, further comprising:
a control module that enables the activation apparatus only if recording of the activation parameters is detected periodically and/or in agreement with definable control parameters.

29. The automated emergency intervention system according to one of claims 15 to 17, wherein
the intervention means comprises automated emergency apparatuses and/or cash-value-based transmission modules.

* * * * *